(12) United States Patent
Lee et al.

(10) Patent No.: US 9,606,287 B2
(45) Date of Patent: Mar. 28, 2017

(54) BACKLIGHT ASSEMBLY AND DISPLAY DEVICE HAVING THE SAME

(71) Applicant: Samsung Display Co., Ltd., Yongin, Gyeonggi-Do (KR)

(72) Inventors: Joon Ik Lee, Asan-si (KR); Man Soo Kim, Asan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 21 days.

(21) Appl. No.: 14/668,635

(22) Filed: Mar. 25, 2015

(65) Prior Publication Data
US 2016/0131827 A1  May 12, 2016

(30) Foreign Application Priority Data
Nov. 11, 2014  (KR) ........................ 10-2014-0156199

(51) Int. Cl.
*G02F 1/1333* (2006.01)
*G02F 1/1335* (2006.01)
*F21V 8/00* (2006.01)

(52) U.S. Cl.
CPC ......... *G02B 6/0088* (2013.01); *G02B 6/0091* (2013.01); *G02F 1/133308* (2013.01); *G02B 6/005* (2013.01); *G02F 1/133606* (2013.01); *G02F 1/133608* (2013.01); *G02F 2001/13332* (2013.01); *G02F 2001/133314* (2013.01); *G02F 2001/133317* (2013.01)

(58) Field of Classification Search
CPC .............. G02F 1/133606; G02F 2001/133607
See application file for complete search history.

(56) References Cited

U.S. PATENT DOCUMENTS

| 2005/0281055 | A1 | 12/2005 | Chang |
| 2008/0136995 | A1* | 6/2008 | Oohira .............. G02F 1/133308 349/58 |
| 2013/0044462 | A1* | 2/2013 | Cheng .................... G02B 6/005 362/97.1 |

FOREIGN PATENT DOCUMENTS

| KR | 10-2006-0080546 A | 7/2006 |
| KR | 10-2008-0035043 A | 4/2008 |
| KR | 10-2009-0100117 A | 9/2009 |
| KR | 10-2013-0017868 A | 2/2013 |

* cited by examiner

*Primary Examiner* — Wen-Ying P Chen
(74) *Attorney, Agent, or Firm* — Robert E. Bushnell, Esq.

(57) ABSTRACT

A backlight assembly and display device having the same. The backlight assembly may include a light source, a light guide formed at one side of the light source, at least one optical sheet disposed on the light guide and have first to fourth sides and first to fourth corners and a mold frame which accommodates and fixes the optical sheet, wherein the optical sheet includes a first tab which protrudes in a same plane as the optical sheet and in a direction perpendicular to the second side while being adjacent to the second corner, and a second tab which protrudes in the same plane as the optical sheet and in a direction perpendicular to the third side and is disposed to be between and spaced apart from the third corner and the fourth corner.

18 Claims, 8 Drawing Sheets

BACKLIGHT ASSEMBLY AND DISPLAY DEVICE HAVING THE SAME

CLAIM OF PRIORITY

This application makes reference to, incorporates the same herein, and claims all benefits accruing under 35 U.S.C. §119 from an application earlier filed in the Korean Intellectual Property Office on the 11 Nov. 2014 and there duly assigned Ser. No. 10-2014-0156199.

BACKGROUND OF THE INVENTION

Field of the Invention

The present invention relates to a backlight assembly and a display device having the same.

Description of the Related Art

A display device is a device which visibly displays data. Examples of a display device may include a liquid crystal display, an electrophoretic display, an organic light emitting display, an inorganic electroluminescent (EL) display, a field emission display, a surface conduction electron emitter display, a plasma display, a cathode ray display, and the like.

Among these display devices, the liquid crystal display is a display in which a liquid crystal layer is disposed between two transparent substrates and light transmittance is adjusted for every pixel by driving the liquid crystal layer to display a desired image.

However, in the liquid crystal display, since the liquid crystal does not voluntarily emit light, a backlight assembly including a light source unit which provides light to the liquid crystal layer is included. Such a backlight assembly generally includes a light source unit, a reflecting plate, a light guiding plate, and various optical sheets.

Such a liquid crystal display is demanded to be light and thin and have a narrow bezel where a display region is formed to be large and a bezel region, which is a non-display region other than the display region, is formed to be as small as possible.

SUMMARY OF THE INVENTION

In a backlight assembly, a protrusion is formed in an optical sheet to fix the optical sheet. The protrusion of the optical sheet formed as described above is formed substantially in a middle region and a bezel region is required as much as the protrusion of the optical sheet. Accordingly, in order to implement a narrow bezel, a width of the protrusion which is formed on the optical sheet needs to be narrowed.

However, when the width of the protrusion of the optical sheet is narrowed, it is hard to fix the optical sheet. Therefore, a mobility of the optical sheet is increased, so that the optical sheet is not fixed but can be easily removed. When the optical sheet is not fixed but can be easily removed, a white line defect or a black line defect may occur, which may lower a display quality.

The present invention has been made in an effort to provide a backlight assembly which improves fixability of an optical sheet and implements a narrow bezel.

The present invention has been made in an effort to further provide a display device which improves fixability of an optical sheet and implements a narrow bezel.

According to an embodiment of present invention, a backlight assembly may include a light source unit which emits light, a light guiding plate which is formed at one side of the light source unit, at least one or more optical sheets which are disposed on the light guiding plate and have first to fourth sides and first to fourth corners which are sequentially connected and a mold frame which accommodates and fixes the optical sheet, wherein the optical sheet includes a first tab which protrudes in a direction perpendicular to the first side while being adjacent to the first corner which is one end of the first side and the second corner which is another end of the first side, and a second tab which protrudes in a direction perpendicular to the second side and is disposed to be spaced apart from the second corner which is one end of the second side and the third corner which is the other end of the second side.

According to an embodiment of present invention, a display device may include a display panel which displays an image, at least one or more optical sheets which are disposed on the light guiding plate and have first to fourth sides and first to fourth corners which are sequentially connected, a mold frame which accommodates and fixes the optical sheet and a bottom chassis which accommodates the optical sheet and the mold frame, wherein the optical sheet includes a first tab which protrudes in a direction perpendicular to the first side while being adjacent to the first corner which is one end of the first side and the second corner which is another end of the first side, and a second tab which protrudes in a direction perpendicular to the second side and is disposed to be spaced apart from the second corner which is one end of the second side and the third corner which is the other end of the second side.

These and other aspects and characteristics of the present invention will be described in or will become apparent from the following description of example embodiments.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section in the claims, without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein Hereinafter, embodiments of the present invention will be described with reference to the drawings.

Figure 1:
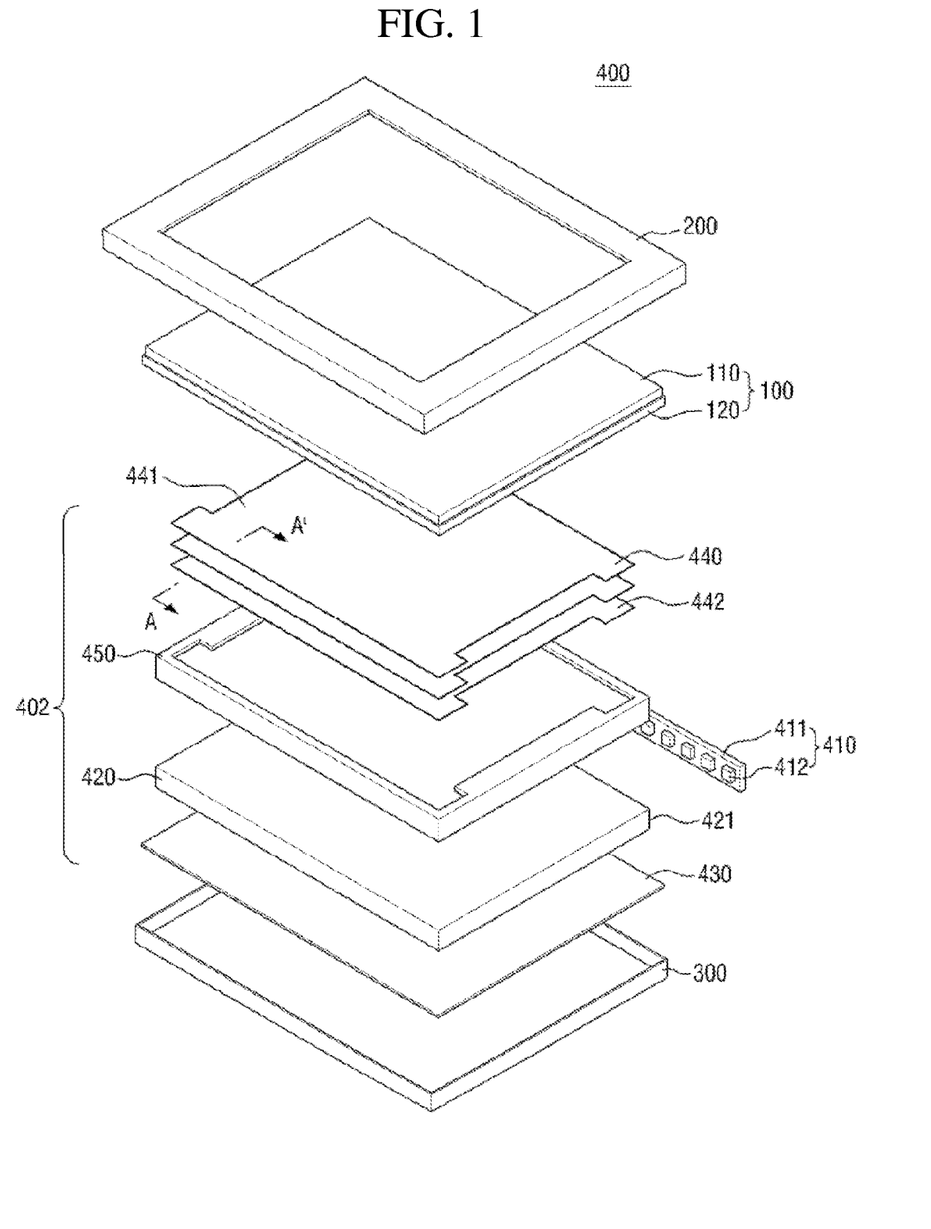
FIG. 1 is an exploded perspective view of a display device according to an embodiment of the present invention.

FIG. 1 is an exploded perspective view of a display device according to an embodiment of the present invention.

Referring to FIG. 1, a display device 400 according to an embodiment of the present invention may include a display panel 100, a top chassis 200, a bottom chassis 300, and a backlight assembly 402.

The display panel 100 is a panel which displays an image and may be a liquid crystal display (LCD) panel, an electrophoretic display panel, an organic light emitting diode (OLED) panel, a light emitting diode (LED) panel, an inorganic electro luminescent (EL) display panel, a field emission display (FED) panel, a surface conduction electron emitter display (SED) panel, a plasma display panel (PDP), or a cathode ray tube (CRT) display panel. Hereinafter, even though a liquid display device will be described as an example of a display device according to an embodiment of the present invention and the display panel 100 is also described as an example of an LCD panel, the display device and the display panel 100 are not limited thereto and various types of a display device and a display panel will be used.

The display panel 100 may include a display region where an image is displayed and a non-display region where an image is not displayed. Alternatively, the display panel 100 may include a first substrate 110, a second substrate 120 which is opposite to the first substrate 110, and a liquid crystal layer (not illustrated) interposed between the first substrate 110 and the second substrate 120.

The first substrate 110 and the second substrate 120 may have a rectangular parallelepiped shape. For the convenience of description, in FIG. 1, the first substrate 110 and the second substrate 120 have been illustrated to have a rectangular parallelepiped shape, but the first substrate 110 and the second substrate 120 may be manufactured to have various shapes depending on a shape of the display panel 100.

The liquid crystal layer may be interposed between the first substrate 110 and the second substrate 120. Further, a sealing member (not shown) such as sealant is disposed along borders of the first substrate 110 and the second substrate 120 between the first substrate 110 and the second substrate 120 so as to bond and seal the first substrate 110 and the second substrate 120.

Even though not illustrated in FIG. 1, the display panel 100 may include a driving unit and a flexible circuit board which are attached to the first substrate 110 or the second substrate 120. The driving unit may apply various signals such as a driving signal which is required to display an image in the display region. The flexible circuit board may output various signals to the driving unit.

The top chassis 200 covers an edge of the display panel 100 and encloses sides of the display panel 100 and the backlight assembly 402. In this case, even though FIG. 1 illustrates that the top chassis 200 has a shape which covers an edge of an entire surface of the display panel 100, the top chassis is not limited thereto. The top chassis 200 may have a borderless shape where a border is not provided on the entire surface to enclose only a side of the display panel 100 or the backlight assembly 402.

The backlight assembly 402 may be accommodated in the bottom chassis 300.

The top chassis 200 and the bottom chassis 300 formed as described above are engaged with each other to enclose the display panel 100 and the backlight assembly 402. The top chassis 200 and the bottom chassis 300 may be formed of a conductive material, for example, metal.

The backlight assembly 402 supplies light to the display panel 100 so that the backlight assembly 402 may be disposed below the display panel 100. Such a backlight assembly 402 may include a light source unit 410, a light guiding plate 420, a reflective plate 430, a plurality of optical sheets 440, and a mold frame 450.

The light source unit 410 generates light and irradiates the generated light onto the light guiding plate 420. The light source unit 410 may be disposed on one side (lateral side) of the light guiding plate 420, that is, on a light entering surface 421. In this case, the light entering surface 421 may be a portion onto which light irradiated from the light source unit 410 onto the light guiding surface 421 is incident.

The light source unit 410 may include a circuit board 411 and a plurality of light sources 412 disposed on the circuit board 411.

The circuit board 411 may be disposed on the light entering surface 421 of the light guiding plate 420. The circuit board 411 is connected to a power supply (not illustrated) to transmit electric energy to the light source 412. A shape of one surface of the circuit board 411 which is opposite to the light entering surface 421 of the light guiding plate 420 may correspond to a shape of the light entering surface 421 of the light guiding plate 420. In an exemplary embodiment, one surface of the circuit board 411 may be parallel to the light entering surface 421 of the light guiding plate 420. Further, an area of one surface of the circuit board 411 may be substantially equal to an area of the light entering surface 421 of the light guiding plate 420.

The plurality of light sources 412 may be disposed on one surface of the circuit board 411. The plurality of light sources 412 may convert the electric energy which is transmitted through the circuit board 411 into light energy. The plurality of light sources 412 may be disposed to be spaced apart from each other with a predetermined interval. Further, the plurality of light sources 412 may be disposed in one line. Furthermore, the plurality of light sources 412 may be disposed so as to correspond to a shape of the light entering surface 421 of the light guiding plate 420 which is opposite thereto. Each of the plurality of light sources 412 may be a light emitting diode (LED). Further, the plurality of light sources 412 may emit blue light. In an exemplary embodiment, each light source 412 may be a blue light emitting diode which emits blue light, but is not limited thereto. In an exemplary embodiment illustrated in FIG. 1, one surface of the circuit board 411 which is in contact with each light source 412 is parallel to the light entering surface 421, but is not limited thereto and one surface of the circuit board 411 which is in contact with each light source 412 may be perpendicular to the light entering surface 421. That is, the light source unit 410 may have a side emitting structure. In this case, a separate reflective layer (not shown) which guides light emitted from the light sources 412 into a direction of the light entering surface 421 may be formed on the light sources 412.

The light guiding plate 420 may be disposed at the side of the light source unit 410. That is, the light guiding plate 420 may be disposed on the substantially same plane as the light source unit 410. The light guiding plate 420 guides the light irradiated from the light source unit 410 to transmit the light onto the display panel 100.

The light guiding plate 420 may be formed of a transparent material. In one exemplary embodiment, the light guiding plate 420 may be formed of polymethyl methacrylate (PMMA), but is not limited thereto and formed of various transparent materials which may guide the light. Further, the light guiding plate 420 may be formed of a rigid material, but is not limited thereto and may be formed of a flexible material.

The light guiding plate 420 may have a rectangular parallelepiped plate shape like the display panel 100. In this specification, the light guiding plate 420 having a rectangular parallelepiped plate shape is mainly described, but is not limited thereto and a light guiding plate 142 having various shapes may be applied.

The reflective plate 430 may be disposed below the light guiding plate 420. The reflective plate 430 may change a path of light which is emitted from the light source unit 410 and is directed below the light guiding plate 420. Such a reflective plate 430 may be formed of a reflective material, for example, metal.

The optical sheets 440 are disposed on a top surface of the light guiding plate 420 to diffuse and concentrate light emitted from the light guiding plate 420. A plurality of optical sheets 440 may be provided and the plurality of optical sheets 440 may be laminated to overlap each other to supplement with each other. For example, the optical sheets 440 may include a prism sheet, a diffusion sheet, and a protection sheet. Moreover, the diffusion sheet may be located between the light guiding plate 420 and the prism sheet to distribute light incident from the light guiding plate 420 to prevent the light from being partially concentrated. The prism sheet may be formed such that prisms having a triangular prism are formed with a predetermined arrangement on one surface thereof and concentrate light diffused from the diffusion sheet in a direction perpendicular to the display panel 100. The protection sheet may be formed on the prism sheet and protect a surface of the prism sheet and diffuse the light to uniformly distribute the light.

The optical sheets 440 may have a main body 441 having a rectangular shape in which first to fourth sides are sequentially connected and corner regions are provided at one end and the other end and the first side and the third side are long sides and a second side and a fourth side are short sides. The optical sheets 440 may have a plurality of tabs 442 which are formed so as to be adjacent to the corners and protrude in a direction perpendicular to the short side and in a same plane as the main body 441. The shape of the optical sheet 440 as mentioned above will be described in detail below.

The optical sheet 440 may be accommodated in the mold frame 450 to be fixed. The optical sheet 440 may be accommodated and fixed in the mold frame 450 by the tabs 442.

The mold frame 450 may be disposed below the optical sheet 440. In FIG. 1, even though it illustrates that the mold frame 450 is disposed below the optical sheet 440, the present invention is not limited thereto and may be disposed above the optical sheet 440, that is, between the display panel 100 and the optical sheet 440. Such a mold frame 450 may fix the optical sheet 440. To this end, an accommodating groove may be formed in a position corresponding to the tab 442 formed on the optical sheet 440. The mold frame 450 fixes not only the optical sheet 440 but also the light source unit 410, the light guiding plate 420, and the reflective plate 430 by being engaged with the bottom chassis 300.

Figure 2:
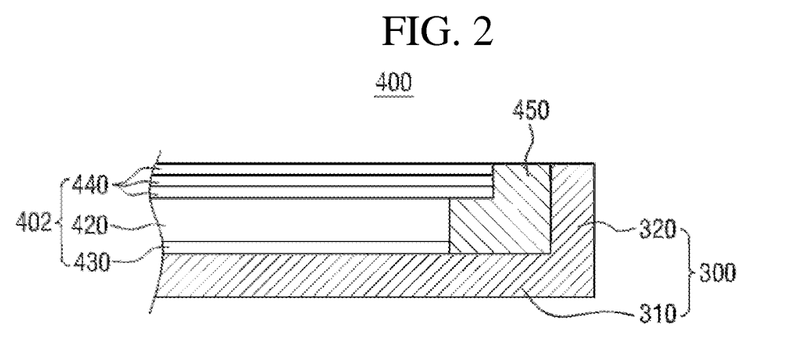
FIG. 2 is a cross-sectional view taken along line A-A' of FIG. 1.
Figure 3:
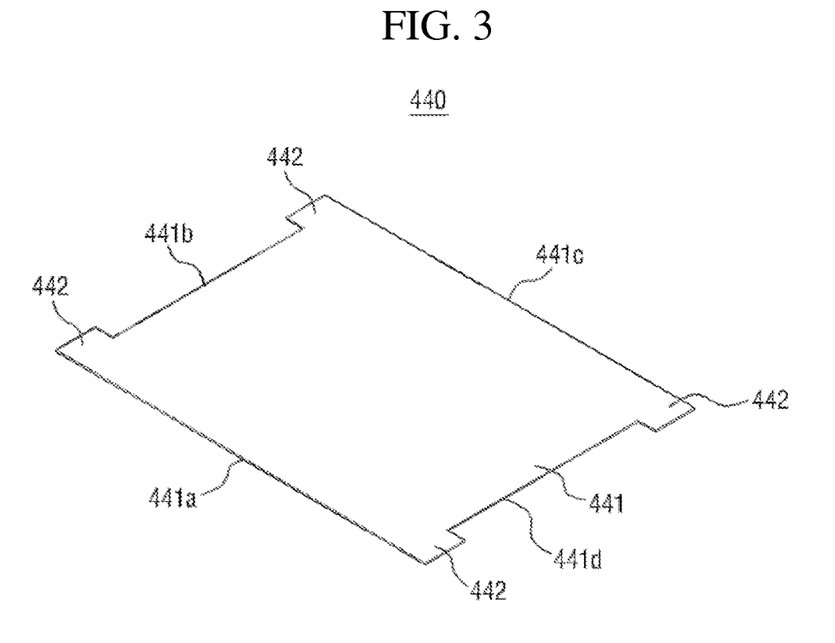
FIG. 3 is a perspective view illustrating an optical sheet of the display device of FIG. 1.
Figure 4:
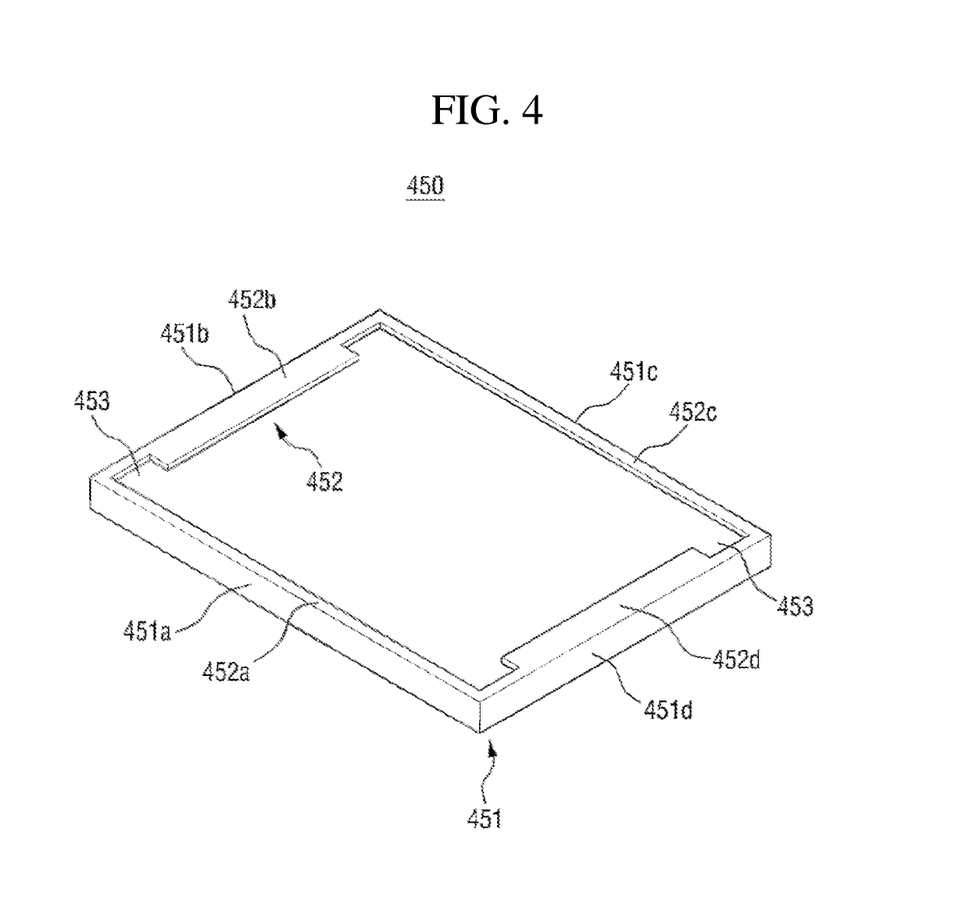
FIG. 4 is a perspective view illustrating a mold frame of the display device of FIG. 1.
Figure 5:
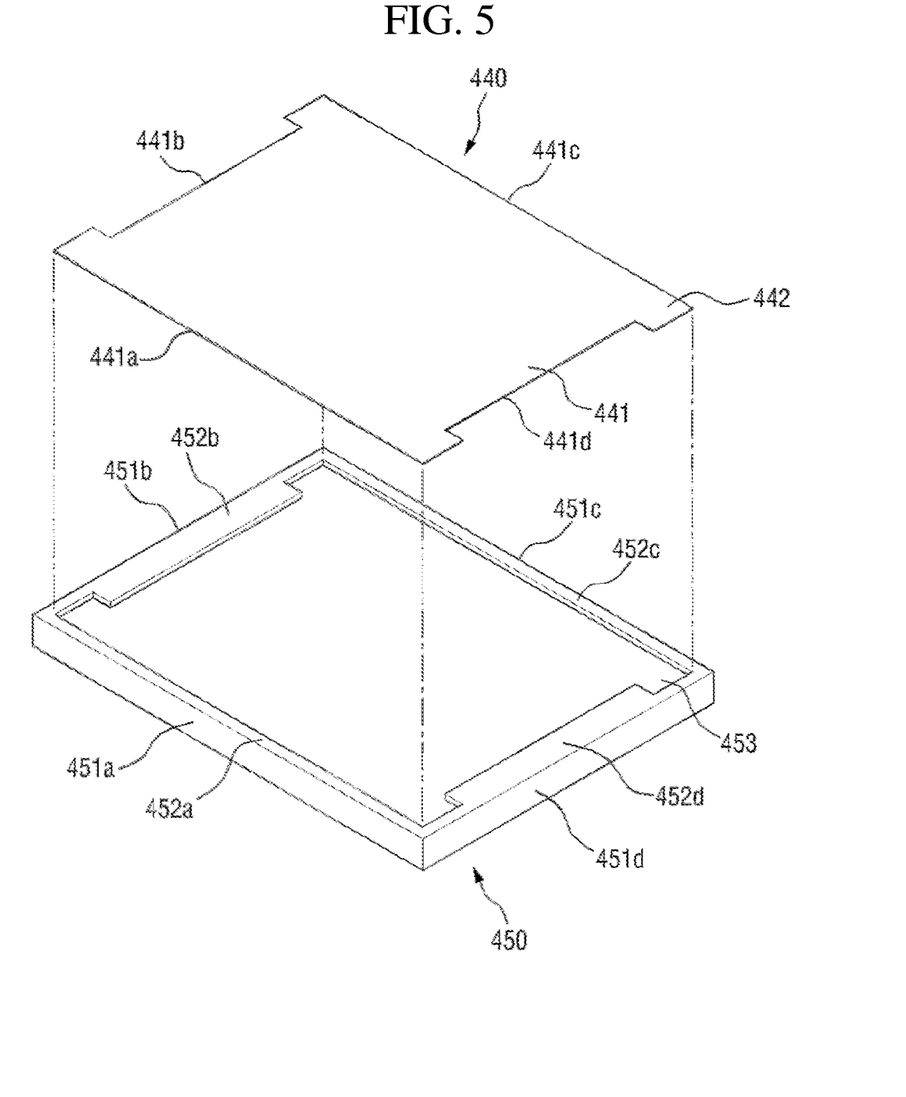
FIG. 5 is a perspective view illustrating coupling of a mold frame and an optical sheet of the display device of FIG. 1.

FIG. 2 is a cross-sectional view taken along line A-A' of FIG. 1, FIG. 3 is a perspective view illustrating an optical sheet of the display device of FIG. 1, FIG. 4 is a perspective view of the mold frame of FIG. 1, and FIG. 5 is a perspective view illustrating coupling of a mold frame and an optical sheet of the display device of FIG. 1.

Referring to FIG. 2, a backlight assembly 402 according to an embodiment of the present invention may be accommodated in a bottom chassis 300 and a reflective plate 430, a light guiding plate 420, and a plurality of optical sheets 440 may be sequentially securely disposed on an upper portion of the bottom unit 310 of the bottom chassis 300. In the meantime, a side wall unit 320 of the bottom chassis 300 may be in contact with a side wall unit of the mold frame 450.

The optical sheet 440 may have a main body unit 441 and plural tabs 442, as illustrated in FIG. 3.

The main body 441 may be disposed above the light guiding plate 420. The main body 441 may have first to fourth sides 441a to 441d and corner regions where the sides meet. As described above, the main body 441 may have a rectangular shape in which first to fourth sides 441a to 441d are sequentially connected, a first side 441a and a third side 441c are long sides and a second side 441b and a fourth side 441d are short sides which are shorter than the first side 441a and the third side 441c.

The tabs 442 may be formed to be adjacent to extend from the second side 441b and the fourth side 441d in corner regions and protrude in a as main body 441 and in a direction perpendicular to the second side 441b and the fourth side 441d. The tabs 442 are formed at the corner regions in order to not only enhance a fixability of the optical sheet 440 but also easily implement a narrow bezel and reduce a management allowance. Tabs 442 do not extend perpendicularly beyond the edges sides 441a and 441c.

As illustrated in FIG. 4, the mold frame 450 may have a rectangular parallelepiped frame shape, and a bottom surface and a top surface thereof may be open. In other words, the mold frame 450 may include a side wall unit 451 having first to fourth side walls 451a, 451b, 451c, and 451d and a fixing unit 452 which accommodates and fixes the optical sheet 440, and an accommodating groove 453 which corresponds to the tab 442 of the optical sheet 440 to fix and accommodate the tab 442 of the optical sheet 440.

In the side wall unit 451, the first side wall 451a and the third side wall 451c may have a long side which is longer than other side walls and the second side wall 451b and the fourth side wall 451d may have a short side. Such a side wall unit 451 may be in contact with the side wall unit 320 of the bottom chassis 300 through an adhesive tape or an adhesive material. As for a reference, even though not illustrated in one embodiment of the present invention, in order to easily fasten the bottom chassis 300 with the side wall unit 451 of the mold frame 450 or to securely dispose the display panel 100, a step having a step shape which allows the display panel to be easily securely disposed may be provided.

The fixing unit 452 may include first to fourth fixing ends 452a, 452b, 452c, and 452d which extend from the first side wall to the fourth side wall 451a, 451b, 451c, and 451d towards a center of the frame shape to prevent the optical sheet 440 from being released. The fixing unit 452 may include an accommodating groove 453 corresponding to a shape of the tab 442 of the optical sheet 440.

The accommodating groove 453 may be formed to have a rectangular U shape at the second fixing end 452b and the fourth fixing end 452d which extend from the second side wall 451b and the fourth side wall 451d to the center, among the first to fourth ends 452a, 452b, 452c, and 452d. The mold frame 450 may be made of a plastic material.

The optical sheet 440 and the mold frame 450 may be fastened to each other such that the optical sheet 440 is inserted into the mold frame 450 as illustrated in FIG. 5.

Figure 6:
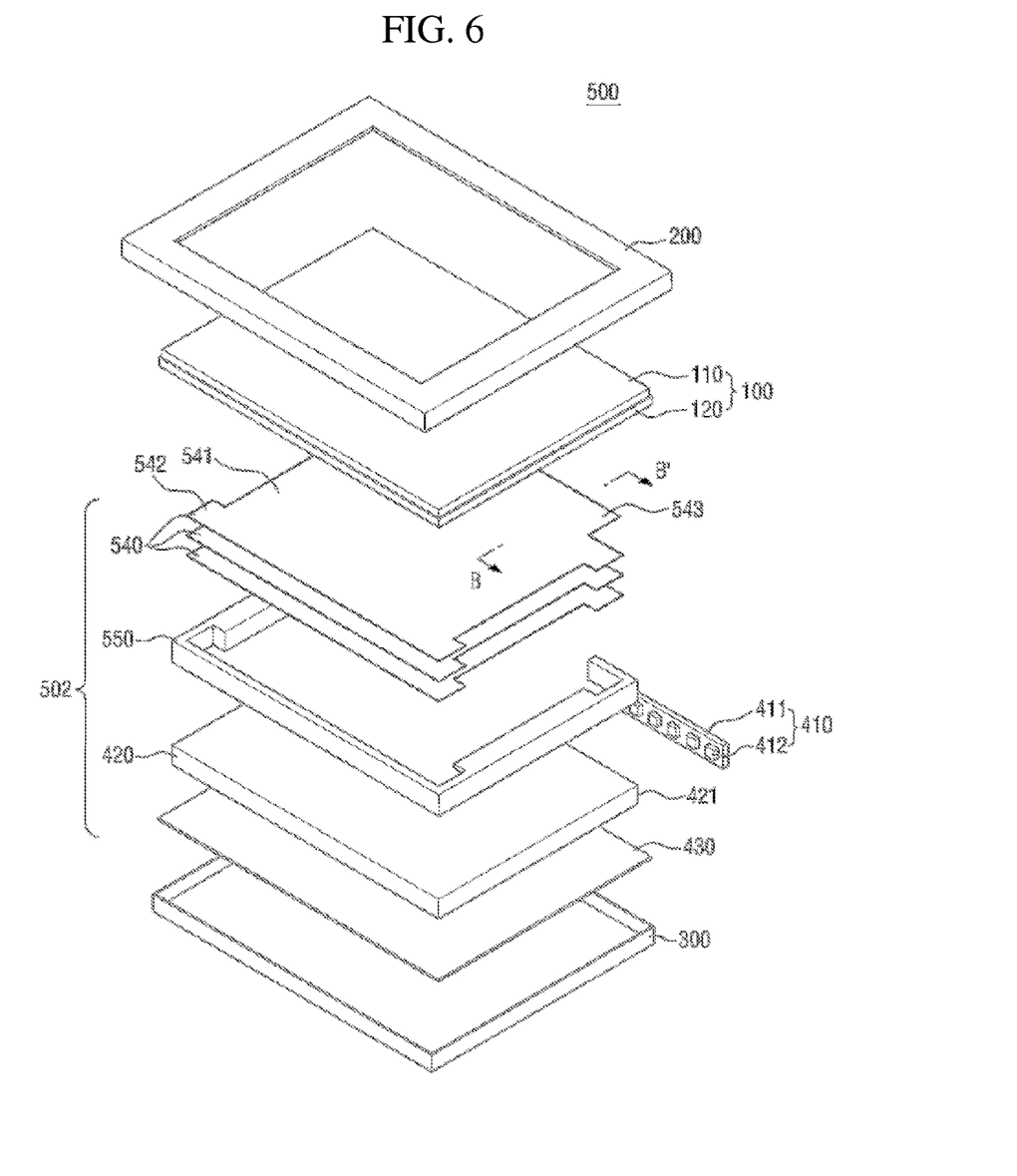
FIG. 6 is an exploded perspective view of a display device according to another embodiment of the present invention.

FIG. 6 is an exploded perspective view illustrating a display device according to another embodiment of the present invention. FIG. 6 illustrates a perspective view which is similar to FIG. 1 and thus description of configurations of a display panel 100, a top chassis 200, and a bottom chassis 300 and a light source unit 410, a light guiding plate 420, and a reflective plate 430 of the configuration of a backlight assembly 502, which are overlapping configurations of FIG. 1, will be omitted.

Referring to FIG. 6, an optical sheet 540 of a display device 500 according to another embodiment of the present invention may be disposed on a top surface of a light guiding plate 420. A main body 541 of optical sheet 540 may have a rectangular shape in which first to fourth sides are sequentially connected and corner regions are provided. The optical sheet may include first tabs 542 which are formed so as to be adjacent to the corner regions and protrude in a same plane of and in a direction perpendicular to the short side, and may include a second tab 543 which protrudes in a same plane of and in a direction perpendicular to one of the long sides. Second tab 543 is disposed between and spaced apart from the corners. Second tab 543 has a length longer than first tab 542.

Detailed description of a shape of the optical sheet 540 according to the embodiment of the present invention will be described below.

The mold frame 550 may accommodate and fix the optical sheet 540. Generally, the mold frame 550 may have a rectangular frame shape where the optical sheet 540 is accommodated and may have a gapping side corresponding to the second tab 543 of the optical sheet, that is, a region where the second tab 543 is accommodated may be open, which will be explained with reference to FIG. 9, later.

Figure 7:
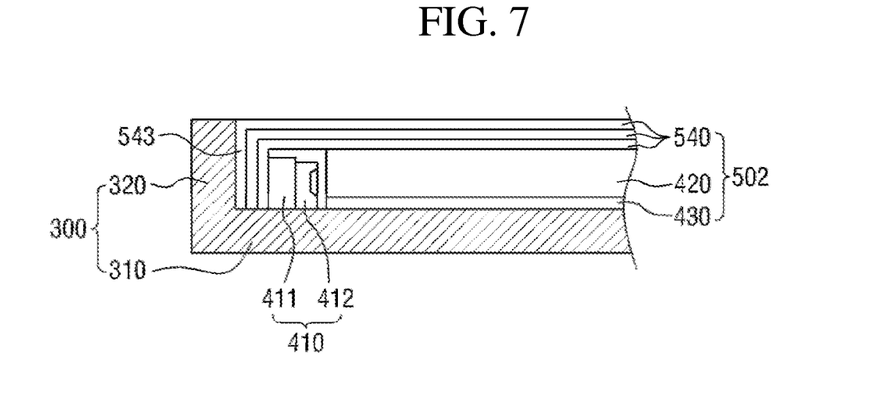
FIG. 7 is a cross-sectional view taken along line B-B' of FIG. 6.
Figure 8:
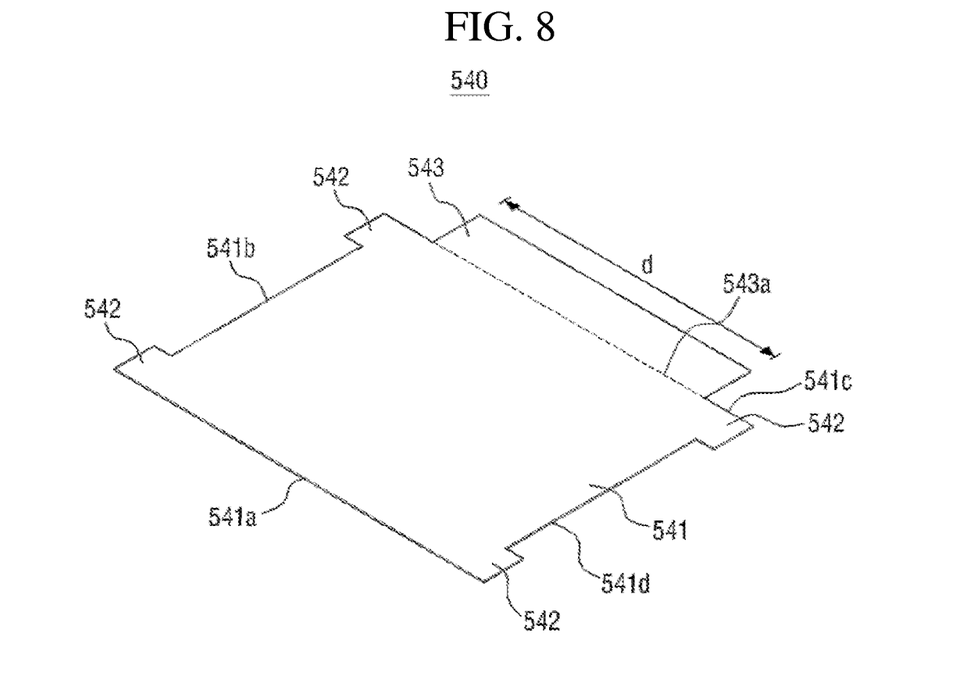
FIG. 8 is a perspective view illustrating an optical sheet of the display device of FIG. 6.
Figure 9:
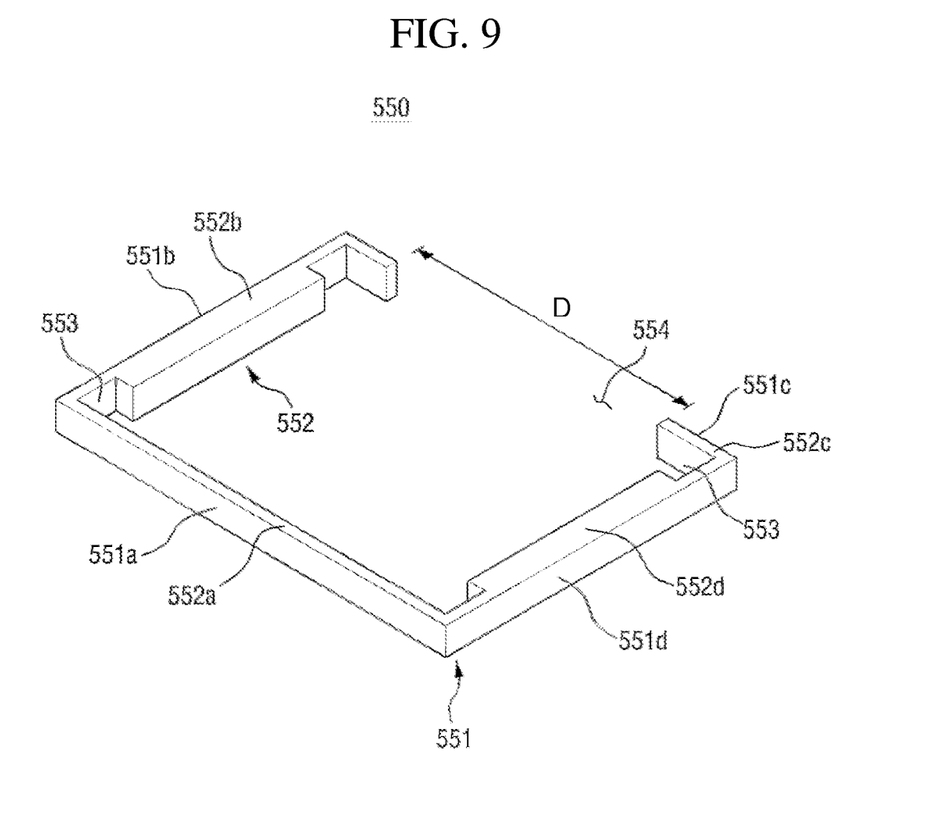
FIG. 9 is a perspective view illustrating a mold frame of the display device of FIG. 6.
Figure 10:
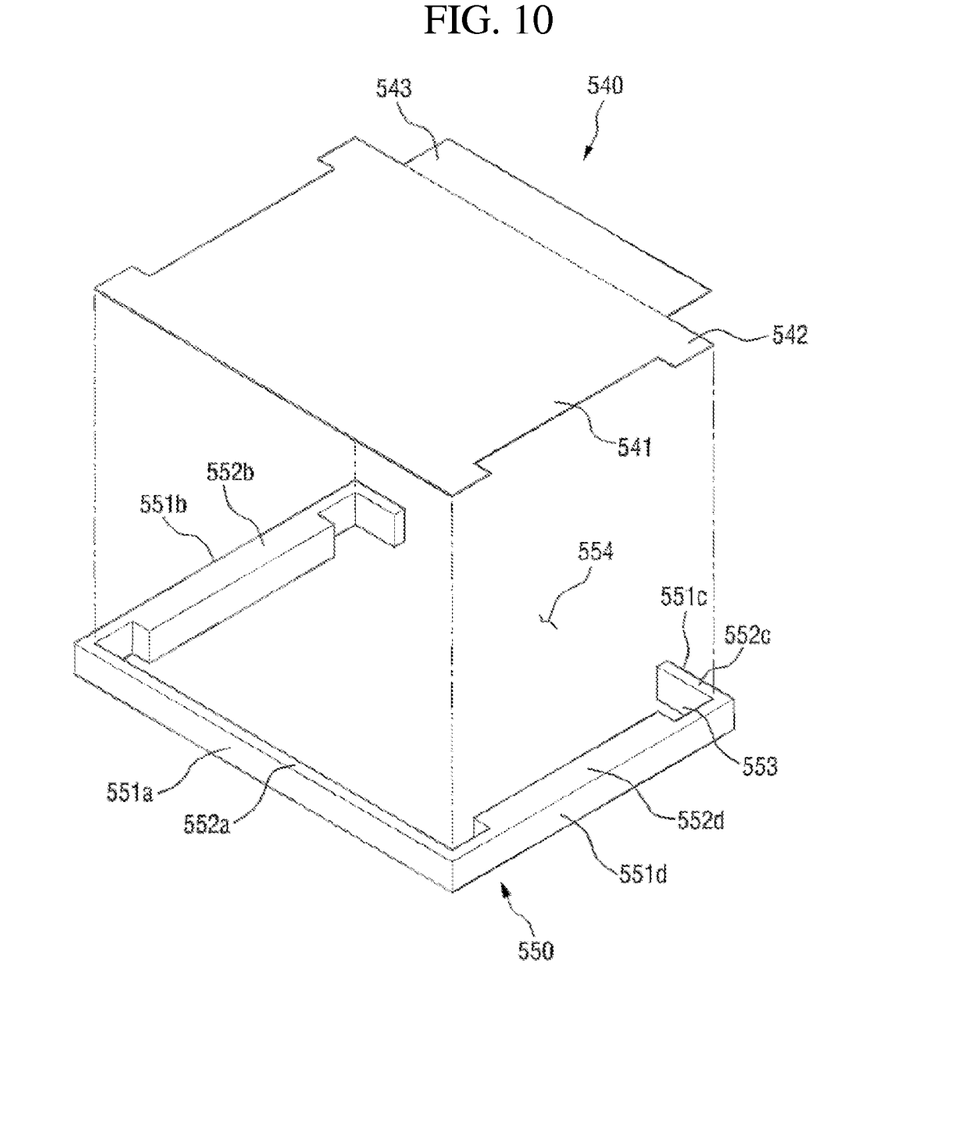
FIG. 10 is a perspective view illustrating coupling of an optical sheet and a mold frame of the display device of FIG. 6.

FIG. 7 is a cross-sectional view taken along line B-B' of FIG. 6, FIG. 8 is a perspective view illustrating an optical sheet of the display device of FIG. 6, FIG. 9 is a perspective view of the mold frame of FIG. 6, and FIG. 10 is a perspective view illustrating coupling of an optical sheet and a mold frame of the display device of FIG. 6.

Referring to FIG. 7, a backlight assembly 502 according to an embodiment of the present invention may be accommodated in a bottom chassis 300 and the bottom chassis 300 may include a bottom 310 on which the light source 410 and the reflective plate 430 are securely disposed and a side wall unit 320 which extends in a direction substantially vertical to the bottom 310 to enclose the bottom 310.

The light source unit 410 which includes a circuit board 411 and a light source 412 is securely disposed on side of the inner-upper surface of the bottom 310 and the reflective plate 430 and the light guiding plate 420 are sequentially laminated on the inner-upper surface of the other side of the bottom 310 to be securely disposed spaced apart from the light source unit 410. A plurality of optical sheets 540 may be securely disposed on an upper surface of the light guiding plate 420, a lower surface of the light guiding plate 420 being disposed on an upper surface of the light source unit 410.

The side wall unit 320 may be in contact with the second tab 543 of the optical sheet 540 through an adhesive tape or an adhesive material. In FIG. 7, even though it is disclosed that the second tab 543 is disposed only one optical sheet 540 among the plurality of optical sheets 540, the present invention is not limited thereto and the second tab 543 may be provided for all of the plurality of optical sheets.

When the optical sheet 540 is described in more detail with reference to FIG. 8, the optical sheet 540 may include a main body 541, the first tab 542 and the second tab 543.

The main body 541 may be disposed above the light guiding plate 420. The main body 541 may have first to fourth sides 541a to 541d and corner regions where each of the sides meet. As described above, the main body 541 may have a rectangular shape in which first to fourth sides 541a to 541d are sequentially connected, a first side 541a and a third side 541c are long sides and a second side 541b and a fourth side 541d are short sides which are shorter than the first side 541a and the third side 541c.

The first tab 542 may be formed to be adjacent to corner regions which are formed at one end and the other end of the second side 541b and the fourth side 541d and protrude in a same plane as main body 541 and in a direction perpendicular to the second side 541b and the fourth side 541d. The first tab 542 is formed at the corner region in order to not only enhance a fixability of the optical sheet 540 but also easily implement a narrow bezel and reduce a management allowance.

The second tab 543 may extend in the same plane as main body 541 and protrude in a direction perpendicular to the third side 541c and may be disposed between a third corner formed at one end of the third side 541c and a fourth corner formed at the other end to be spaced apart from the third corner and the fourth corner. The second tab 543 may have a length "d". In this case, the third side 541c may be a side through which the light is incident. That is, the third side may be a side where the light source unit 410 is disposed. The second tab 543 may be formed to increase a guiding amount of the optical sheet 540 to improve fixability of the optical sheet 540. When the second tab 543 formed as described above is coupled to the side wall 320 of the bottom chassis 300, the second tab 543 may be folded along a folding line 543a.

As illustrated in FIG. 9, the mold frame 550 may have a rectangular parallelepiped frame shape, wherein a large portion of a bottom surface may be open, a large portion of a top surface may be open, and a part of one side wall through which light is incident, among four side walls, may be open. The mold frame 550 may include a side wall unit 551 having first to fourth side walls 551a, 551b, 551c, and 551d, a fixing unit 552 which accommodates and fixes the optical sheet 540, accommodating grooves 553 which corresponds to the first tabs 542 to accommodate the first tabs 542 of the optical sheet 540, and an opening 554 which corresponds to the second tab 543, the opening 554 being formed in the side wall 551c through which the light is incident of the optical sheet 540.

In the side wall unit 551, the first side wall 551a and the third side wall 551c may have a long side longer than the second side wall 551b and the fourth side wall 551d having a short side. The side wall unit 551 may be formed to correspond to the second tab 543 of the optical sheet 540 and the second tab 543 of the optical sheet 540 may be in contact with the side wall unit 320 of the bottom chassis 300 through the opening 554. Further, even though not illustrated in one embodiment of the present invention, in order to easily fasten the bottom chassis 300 with the side wall unit 551 of the mold frame or to securely dispose the display panel 100, a step having a step shape which allows the display panel to be easily securely disposed may be provided.

The fixing unit 552 may include first to fourth fixing ends 552a, 552b, 552c, and 552d which extend from the first side wall to the fourth side wall 551a, 551b, 551c, and 551d toward a center of the frame shape to prevent the optical sheet 540 from being released. The third fixing end 552c which corresponds to a surface onto which the light is incident may be formed to be open like the third side 551c. The fixing unit 552 may include accommodating grooves 553 corresponding to a shape of the first tabs 542 of the optical sheet 540.

The accommodating grooves 553 may be formed to have a rectangular U shape at the second fixing end 552b and the fourth fixing end 552d which extend from the second side wall 551b and the fourth side wall 551d. The mold frame 550 may be made of a plastic material.

The opening 554 may have a width "D" which may be equal to the length "d" of the second tab 543 of the optical sheet 540. The second tab 543 of the optical sheet 540 may be coupled to the side wall 320 of the bottom chassis 300 through the opening 554 by an adhesive tape or an adhesive material.

The optical sheet 540 and the mold frame 550 may be fastened to each other such that the optical sheet 540 is inserted into the mold frame 550 as illustrated in FIG. 10.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein

What is claimed is:

1. A backlight assembly, comprising:
   a light source unit which emits light;
   a light guiding plate which is formed at one side of the light source unit;
   at least one or more optical sheets which are disposed on the light guiding plate, each optical sheet having a rectangular shaped main body having first to fourth sides and first to fourth corners which are sequentially connected, the first corner being formed by the first and fourth sides, the second corner being formed by the first and second sides, the third corner being formed by the second and third sides and the fourth corner being formed by the third and fourth sides; and a mold frame of constant depth which accommodates and fixes the light source unit, the light guiding plate and each optical sheet, wherein the at least one of the optical sheets includes:
a first tab which continuously protrudes in a same plane as the main body and in a direction perpendicular to the second side while being adjacent to the second corner, one edge of the first tab intersecting an edge of the first side, and
a second tab which protrudes in the same plane as the main body and in a direction perpendicular to the third side and is disposed to be between and spaced apart from the third corner and the fourth corner.

2. The backlight assembly of claim 1, wherein the second side and the fourth side are short sides and the first side and the third side are long sides longer that the short sides.

3. The backlight assembly of claim 1, further comprising:
a third tab which continuously protrudes in the same plane as the main body and in a direction perpendicular to the fourth side while being adjacent to the fourth corner, one edge of the third tab intersecting an edge of the third side.

4. The backlight assembly of claim 1, wherein the third side of the at least one optical sheet is a side adjacent a light entering surface of the light guiding plate onto which the light is incident.

5. The backlight assembly of claim 1, wherein the at least one optical sheet has a folding line by which the second tab is downwardly folded perpendicular to the plane of the main body.

6. The backlight assembly of claim 3, wherein the mold frame has a frame shape to accommodate each optical sheet and includes a first accommodating groove which is formed in a position corresponding to the first tab to fix and accommodate the first tab; an opening which is formed by completely opening a side wall of the mold frame corresponding to the second tab; and a second accommodating groove which is formed in a position corresponding to the third tab to fix and accommodate the third tab.

7. The backlight assembly of claim 6, wherein an opening width of the opening of the mold frame is equal to a length of the second tab.

8. A display device, comprising:
a display panel which displays an image;
a backlight assembly comprising:
a light source unit which emits light;
a light guiding plate which is formed at one side of the light source unit;
at least one or more rectangular shaped optical sheets which are disposed on the light guiding plate, each of the optical sheets having first to fourth sides and first to fourth corners which are sequentially connected; and
a mold frame of constant depth which accommodates and fixes each optical sheet, the light source unit and the light guiding plate; and
a bottom chassis which accommodates the backlight assembly, wherein the at least one optical sheet includes:
a first tab which protrudes in a same plane as the at least one optical sheet and in a direction perpendicular to the second side while being adjacent to the second corner, and
a second tab which protrudes in the same plane as the at least one optical sheet and in a direction perpendicular to the third side and is disposed to be between and spaced apart from the third corner and the fourth corner.

9. The display device of claim 8, wherein the second side and the fourth side are short sides and the first side and the third side are long sides longer that the short sides.

10. The display device of claim 8, further comprising:
a third tab which protrudes in the same plane as the at least one optical sheet and in a direction perpendicular to the fourth side while being adjacent to the fourth corner.

11. The display device of claim 8, wherein the third side of the at least one optical sheet is a side adjacent a light entering surface of the light guiding plate onto which the light is incident.

12. The display device of claim 8, wherein the at least one optical sheet has a folding line by which the second tab is downwardly folded perpendicular to the plane of the at least one optical sheet.

13. The display device of claim 12, wherein the second tab which is folded by the folding line is in contact with the bottom chassis.

14. The display device of claim 8, wherein the mold frame has a frame shape to accommodate each optical sheet and includes a first accommodating groove which is formed in a position corresponding to the first tab to fix and accommodate the first tab; an opening which is formed by opening a side wall of the mold frame corresponding to the second tab; and a second accommodating groove which is formed in a position corresponding to the third tab to fix and accommodate the third tab.

15. The backlight assembly of claim 14, wherein an opening width of the opening of the mold frame is equal to a length of the second tab.

16. The display device of claim 9, wherein at least a second one of optical sheets comprises at least two tabs extending from each short side in a same plane as the at least second one optical sheet and in a direction perpendicular to the short sides, each respective tab being disposed adjacent to respective ones of the corners.

17. The display device of claim 8, wherein display panel comprises a liquid crystal display panel having a first substrate and a second substrate.

18. The display device of claim 17, further comprising a top chassis engaged with the bottom chassis to enclose the display panel and the backlight assembly.

* * * * *